US012747785B2

(12) United States Patent
Quinn

(10) Patent No.: US 12,747,785 B2
(45) Date of Patent: Sep. 29, 2026

(54) TRANSMISSION SYSTEM

(71) Applicant: ZEROSHIFT TRANSMISSIONS LIMITED, Milton Keynes (GB)

(72) Inventor: Neil Quinn, Abergwynfi (GB)

(73) Assignee: ZEROSHIFT TRANSMISSIONS LIMITED, Milton Keynes (GB)

( * ) Notice: Subject to any disclaimer, the term of this patent is extended or adjusted under 35 U.S.C. 154(b) by 0 days.

(21) Appl. No.: 18/840,286

(22) PCT Filed: Feb. 24, 2023

(86) PCT No.: PCT/GB2023/050423
§ 371 (c)(1),
(2) Date: Aug. 21, 2024

(87) PCT Pub. No.: WO2023/161647
PCT Pub. Date: Aug. 31, 2023

(65) Prior Publication Data

US 2025/0164007 A1 May 22, 2025

(30) Foreign Application Priority Data

Feb. 25, 2022 (GB) ..................................... 2202630

(51) Int. Cl.
*F16H 63/32* (2006.01)
*F16H 61/684* (2006.01)
*F16H 63/30* (2006.01)

(52) U.S. Cl.
CPC ........... *F16H 63/32* (2013.01); *F16H 61/684* (2013.01); *F16H 2063/3093* (2013.01)

(58) Field of Classification Search
CPC ...... F16H 61/684; F16H 61/688; F16H 63/18; F16H 63/32; F16H 2003/007; F16H 2063/3093; F16H 2063/3056
See application file for complete search history.

(56) References Cited

U.S. PATENT DOCUMENTS

2004/0266584 A1 12/2004 Janson et al.

FOREIGN PATENT DOCUMENTS

GB 2573592 A * 11/2019 ............. F16H 3/006
WO WO 2021/156585 A1 8/2021

OTHER PUBLICATIONS

Search Report and Written Opinion received in International Application No. PCT/GB2023/050423, dated Aug. 4, 2023.

* cited by examiner

*Primary Examiner* — William C Joyce
(74) *Attorney, Agent, or Firm* — Knobbe, Martens, Olson & Bear, LLP

(57) ABSTRACT

A transmission system including: a first gear selector assembly that includes a first and selector rings, the first and second selector rings being movable translationally relative to one another; wherein the first selector ring includes a first set of engagement members fixed together by a first annular member, and each engagement member in the first set includes a first part located on a first side of the first annular member and a second part located on a second side of the first annular member, each first part having a first drive face oriented generally in a first rotational direction and a first non-drive face oriented generally in a second rotational direction.

22 Claims, 10 Drawing Sheets

380
305
300
307

TRANSMISSION SYSTEM

CROSS-REFERENCE TO RELATED APPLICATIONS

This application is the U.S. National Stage Application under 35 U.S.C. § 371 of International Application No. PCT/GB2023/050423, filed Feb. 24, 2023, designating the U.S. and published in English as WO 2023/161647 A1 on Aug. 31, 2023, which claims the benefit of Great Britain Patent Application No. GB 2202630.6, filed Feb. 25, 2022. Any and all applications for which a foreign or a domestic priority is claimed are identified in the Application Data Sheet filed herewith and are hereby incorporated by reference in their entirety.

TECHNICAL FIELD

The present invention relates to a transmission system.

BACKGROUND

In conventional single clutch synchromesh transmission systems for vehicles it is necessary to disengage the transmission from the power source, such as an engine or motor, by operating the clutch before the current gear is deselected and the new gear is engaged. If the power is not disengaged when attempting to engage a new gear the synchromesh is unable to engage the new gear element or has to be forced into engagement with the risk of damaging the transmission and creating torque spikes in the transmission. This is because in most cases the speed of the engine is not matched to the speed of the new gear. For motor vehicles such as cars having conventional gearboxes and powered by an engine, the selection of a new gear ratio typically takes between 0.5 and 1 second to complete. So, for example, when a higher gear is selected the time delay allows the engine to reduce its speed [due to its own inertia] to more closely match the speed of the new gear before the clutch re-connects the engine and the transmission, thereby reducing the possibility of torque spikes occurring when the power is reapplied.

Dual Clutch Transmission (DCT) systems have tried to address this problem by using two clutches to handover the transfer of torque seamlessly when shifting between gears. However there are a number of drawbacks to DCTs, for example they require the use of two friction clutches which are heavy and expensive, they are complex to control and have parasitic losses and therefore are not very efficient.

Another type of seamless transmission system is referred to as an instantaneous type transmission system. This family of transmission systems includes at least one selector assembly that includes first and second sets of engagement elements that are arranged to selectively engage drive formations on the or each gear element associated with it. In some instantaneous transmission systems, the first and second set sets of engagement elements are arranged such that a new gear can be selected while the current gear is still engaged and therefore the new gear can be selected under power for some shift types. Typically at least one selector assembly in an instantaneous transmission system has four modes of operation with respect to the or each rotatably mounted gear element associated with it: fully engaged in both torque directions (fully in gear); disengaged in both torque directions (neutral); engaged in the forward torque direction while disengaged in the reverse torque direction; and disengaged in the forward torque direction while engaged in the reverse torque direction.

It is the last two modes that enable a discrete ratio gearbox to have the ability to shift up or down ratios instantly under load without torque interruption. Instantaneous transmissions are described in WO 2004/099654, WO 2005/005868, WO 2005/005869, WO 2005/024261 and WO 2005/026570, WO 2006/095140, WO 2006/123128, WO2006/123166, WO2007/132209, WO2008/062192, WO2008/096140, WO2008/145979, WO2009/068853, WO2010/046654, WO2010/046655, WO2010/046652, WO2012/164237, WO2020/128412, WO2020/183118, and WO2021/156585 the contents of which are incorporated by reference.

In some circumstances, it is desirable to package an instantaneous type transmissions system in an efficient a way as possible. The inventor has identified that by redesigning a gear selector assembly actuator system, it is possible to improve the packaging of the transmission system, and reduce the number of actuator components required.

Another issue for known instantaneous type transmission systems is that for at least one selector assembly each gear selector ring is opposite handed, and therefore it has been necessary to have separate tooling to manufacture first and second gear selector rings. This is undesirable since it adds additional manufacturing cost and time.

Accordingly, the invention seeks to mitigate at least one of the aforementioned problems, or at least to provide an alternative transmission system to existing transmission systems.

SUMMARY

According to a first aspect of the invention there is provided a transmission system according to claim 1. The invention provides an instantaneous type transmission system that includes a selector assembly wherein first and second selector rings can be identical.

According to another aspect there is provided a transmission system.

The transmission can include a first gear selector assembly. The first gear selector assembly can include a first selector ring. The first gear selector assembly can include a second selector ring. The first and second selector rings can be movable translationally relative to one another. The first selector ring can include a first set of engagement members fixed together by a first annular member. Each engagement member in the first set can include a first part located on a first side of the first annular member and a second part located on a second side of the first annular member. Each first part can have a first drive face oriented generally in a first rotational direction. Each first part can have a first non-drive face oriented generally in a second rotational direction. Each second part can include a second drive face oriented generally in the first rotational direction. Each second part can include a second non-drive face oriented generally in the second rotational direction.

The second selector ring can include a second set of engagement members fixed together by a second annular member. Each engagement member in the second set can include a first part located on a first side of the second annular member. Each engagement member in the second set can include a second part located on a second side of the second annular member. Each first part can have a first drive face oriented generally in the second rotational direction. Each first part can have a first non-drive face oriented generally in the first rotational direction. Each second part can include a second drive face oriented generally in the second rotational direction. Each second part can include a second non-drive face oriented generally in the first rotational direction.

Typically, the first selector ring can be identical to the second selector ring.

The engagement members in the first set of engagement members can be angularly distributed evenly about the first annular member. For example, the first set of engagement members can include 2 to 4, and preferably 3 engagement members. For a set of 3 engagement members, an angle subtended between an adjacent pair of engagement members can be approximately 120°.

The engagement members in the second set of engagement members can be angularly distributed evenly about the second annular member. For example, the second set of engagement members can include 2 to 4, and preferably 3 engagement members. For a set of 3 engagement members, an angle subtended between an adjacent pair of engagement members can be approximately 120°.

The first selector ring can include a first set of recesses formed through the first annular member, wherein each recess in the first set of recesses can be sized, shaped and positioned to receive a respective one of the engagement members in the second set of engagement members. The first set of recesses facilitates relative translational movement between the first and second selector rings.

The second selector ring can include a second set of recesses formed through the second annular member, wherein each recess in the second set of recesses can be sized, shaped and positioned to receive a respective one of the engagement members in the first set of engagement members. The second set of recesses facilitates relative translational movement between the first and second selector rings.

The transmission system can include an actuator assembly arranged to control movement of the first and second selector rings.

The first selector assembly can be mounted on a shaft. A first gear element can be rotatably mounted on the shaft. A second gear element can be rotatably mounted on the shaft. The first selector assembly can be arranged to selectively lock the first and second gear elements for rotation with the first shaft. The shaft can comprise a first lay shaft.

The first gear selector assembly can be arranged to selectively engage the first gear element with the following operational modes: lock the first gear element for rotation with the shaft in forward and reverse torque directions; lock the first gear element for rotation with the shaft in the forward torque direction and not lock in the reverse torque direction; and lock the first gear element for with rotation with the shaft in the reverse torque direction and not lock in the forward torque direction.

In a condition wherein the first gear element can be engaged by the first and second sets of engagement members and can be locked for rotation in forward and reverse torque directions, one of the first and second sets of engagement members can be in a loaded condition and the other of the first and second sets of engagement members can be in an unloaded condition. The actuator assembly can be arranged to selectively move the unloaded set of engagement members out of engagement with the first gear element, for example to a neutral position.

The first gear selector assembly can be arranged to selectively engage the second gear element with the following operational modes: lock the second gear element for rotation with the shaft in forward and reverse torque directions; lock the second gear element for rotation with the shaft in the forward torque direction and not lock in the reverse torque direction; and lock the second gear element for with rotation with the shaft in the reverse torque direction and not lock in the forward torque direction.

In a condition wherein the second gear element can be engaged by the first and second sets of engagement members and can be locked for rotation in forward and reverse torque directions, one of the first and second sets of engagement members can be in a loaded condition and the other of the first and second sets of engagement members can be in an unloaded condition. The actuator assembly can be arranged to selectively move the unloaded set of engagement members out of engagement with the second gear element, for example to a neutral position.

The first selector assembly can be mounted on to the shaft by means of a support sleeve. The support sleeve can include internal splines arranged to lock the support sleeve for rotation with the shaft.

At least one, and preferably each, of the engagement members in the first set of engagement members can include a rectilinear formation formed on an inwardly facing side. The formation can be arranged to engage with a complementary formation of the support sleeve. Typically, the formation comprises a channel, and the complementary formation comprises a spline. This provides a robust connection and allows the engagement members to move axially with respect to the shaft.

At least one, and preferably each, of the engagement members in the second set of engagement members can include a rectilinear formation formed on an inwardly facing side, that can be arranged to engage with a complementary formation of a support sleeve. Typically, the formation comprises a channel, and the complementary formation comprises a spline. This provides a robust connection and allows the engagement members to move axially with respect to the shaft.

The first gear selector assembly can be arranged to provide torque support during a gear shift, to ensure that there can be no loss of drive during the gear shift.

The transmission system can include a second gear selector assembly. The actuator assembly can be arranged to control operation of the second gear selector assembly.

The transmission system can include a third gear selector assembly. The actuator assembly can be arranged to control operation of the third gear selector assembly.

The actuator assembly can include a shift drum. The shift drum can include first and second parts. The second part can be arranged to rotate relative to the first part. The second part can include a first control slot that can be arranged to control operation of the first selector assembly.

The second part can include a second control slot that can be arranged to control operation of the second gear selector assembly. The first part can include a third control slot that can be arranged to control operation of the third gear selector assembly.

The actuator assembly can include a first shift fork assembly, the first shift fork assembly can include a first shift fork arranged to control axial movement of the first selector ring, and a second shift fork arranged to control axial movement of the second selector ring.

The actuator assembly can include a first shift collar mounted on a first shift rail. The first shift collar can include a first control member that engages with the first control slot. The shift drum can be arranged such that adjusting the rotational orientation of the second part of the shift drum adjusts the position of the first control member along the first control slot, which controls the axial position of the first shift collar with respect to the first shift rail, and hence the axial positions of at least one of the first and second selector rings.

The second gear selector assembly can include a third selector ring. The actuator assembly can include a second shift fork assembly, the second shift fork assembly can include a third shift fork arranged to control axial movement of the third selector ring.

The transmission system can include a first input shaft that is directly connected to the output of a drive source. The transmission system can include a second input shaft that is connected to the output of the drive source via a friction clutch.

The second gear selector assembly can be mounted on the second input shaft. A third gear element can be rotatably mounted on the second input shaft. A fourth gear element can be rotatably mounted on the second input shaft. The second gear selector assembly can be arranged to selectively lock each of the third and fourth gear elements for rotation with the second input shaft.

Odd gears can be grouped together in a first part of the transmission system. Even gears can be grouped together in a second part of the transmission system. The second gear selector assembly can be arranged to select between odd and even gears by selectively creating torque pathways to the first and second parts of the transmission.

The third gear selector assembly can include a further selector ring. The actuator assembly can include a further shift fork assembly, the further shift fork assembly can include a further shift fork arranged to control axial movement of the further selector ring.

The transmission system can include an output shaft. The third gear selector assembly can be mounted on one of the output shaft, a second lay shaft and a sleeve mounted on the second lay shaft. At least one further gear element can be rotatably mounted on the same shaft as third gear selector assembly. The third gear selector assembly can be arranged to selectively lock the at least one further gear element for rotation with the shaft on which it is mounted.

The third gear selector assembly can comprise a pre-select selector assembly, which can be arranged to pre-select a new gear during a gear shift, for example prior to the first and second gear selector assemblies being operated.

According to another aspect there is provided a transmission system.

The transmission can include a first gear selector assembly. The first gear selector assembly can include a first selector ring having a first set of engagement members. The first gear selector assembly can include a second selector ring having a second set of engagement members. The first and second selector rings can be moved translationally relative to one another.

The transmission can include a second gear selector assembly.

The transmission can include a third gear selector assembly.

The transmission can include an actuator assembly for controlling operation of the first, second and third gear selector assemblies. The actuator assembly can include a shift drum having first and second parts. The second part can be arranged to rotate relative to the first part. The second part can include a first control slot that is arranged to control operation of the first selector assembly. The second part can include a second control slot that is arranged to control operation of the second gear selector assembly. The first part can include a third control slot that is arranged to control operation of the third gear selector assembly.

The actuator assembly can include a first motor. The first motor can be arranged to rotate the first part of the shift drum.

The actuator assembly can include a second motor. The second motor can be arranged to rotate the second part of the shift drum. Thus first and second parts of the shift drum can be rotated independently of one another.

The first part of the shift drum can include a shaft having a flange (sometimes referred to as a shoulder) towards one end. The third control slot can be formed in a curved surface of the flange.

The first part of the shift drum can include a first sleeve mounted on the shaft. The first sleeve can be mounted on the shaft towards an opposite end of the shaft from the flange. The first sleeve can be fixed for rotation with the shaft.

At least one additional control slot can be formed in the curved surface of the first sleeve. Typically, the number of control slots in the first part of the shift drum matches the number of pre-select gear assemblies, which is discussed below.

The second part of the shift drum can comprise a second sleeve rotatably mounted on the shaft. The first and second control slots can be formed in the curved surface of the second sleeve. Typically, the second sleeve can be located between the first sleeve and the flange. With this configuration, the first sleeve assists assembly of the shift drum, for example it enables the second sleeve to be rotatably mounted on to the shaft.

The actuator assembly can include a first shift fork assembly. The first shift fork assembly can include a first shift fork arranged to control axial movement of the first selector ring. The actuator assembly can include a second shift fork arranged to control axial movement of the second selector ring.

The actuator assembly can include a first shift collar mounted on a first shift rail. The first shift collar can include a first control member that engages with the first control slot. The shift drum can be arranged such that adjusting the rotational orientation of the second part of the shift drum adjusts the position of the first control member along the first control slot, which controls the axial position of the first shift collar with respect to the first shift rail.

Adjusting the axial position of the first shift collar on the first shift rail, adjusts the axial position of at least one of: the first shift fork-first selector ring pair; and the second shift fork-second selector ring pair, with respect to the first shift rail.

The first and second shift forks can be mounted on a second shift rail. An arm can protrude from the shift collar. The arm can be fixed to the second shift rail. The arm can be arranged to adjust the axial position of at least one of the first and second shift forks with respect to the second shift rail.

The actuator assembly can include resilient means arranged to bias the first shift fork to a first axial position. The first axial position can be in a neutral operational condition. The actuator assembly can include resilient means arranged to bias the second shift fork to a second axial position. The second axial position can be a neutral operational condition. The neutral operation condition is a condition in which the respective selector ring does not engage either of the gear elements associated therewith.

The first gear selector assembly can be mounted on a first lay shaft. A first gear element can be rotatably mounted on the first lay shaft. A second gear element can be rotatably mounted on the first lay shaft. The first gear selector assembly can be arranged to selectively lock each of the first and second gear elements for rotation with the first lay shaft. The actuator assembly can be arranged to move the first selector ring into engagement with the first gear element to lock the first gear element for rotation with the first lay shaft. The actuator assembly can be arranged to move the first selector ring into engagement with the second gear element to lock the second gear element for rotation with the first lay shaft. The actuator assembly can be arranged to move the second selector ring into engagement with the first gear element to lock the first gear element for rotation with the first lay shaft. The actuator assembly can be arranged to move the second selector ring into engagement with the second gear element to lock the second gear element for rotation with the first lay shaft.

The first gear selector assembly can be arranged to: lock the first gear element for rotation with the first lay shaft in forward and reverse torque directions; lock the first gear element for rotation with the first lay shaft in the forward torque direction and not lock in the reverse torque direction; and lock the first gear element for with rotation with the first lay shaft in the reverse torque direction and not lock in the forward torque direction.

The first gear selector assembly can be arranged to: lock the second gear element for rotation with the first lay shaft in forward and reverse torque directions; lock the second gear element for rotation with the first lay shaft in the forward torque direction and not lock in the reverse torque direction; and lock the second gear element for with rotation with the first lay shaft in the reverse torque direction and not lock in the forward torque direction.

The first selector ring can be identical to the second selector ring. This was not the case with previous instantaneous selector assemblies. Having identical selector rings reduces the manufacturing costs of the transmission system.

Each engagement member in the first set of engagement members has a first end and a second end. The first end can include a first drive face and a first non-drive face. The second end can include a second drive face and a second non-drive face. The first and second drive faces can be oriented to face in the same rotational direction. This differs from prior instantaneous selector assemblies, wherein the drive faces on any given engagement member are oriented in opposite rotational directions, and therefore separate gear selector rings are required since the selector rings are not interchangeable. Having the drive faces of each engagement member in a selector ring face in the same rotational direction helps to enable a pair of identical selector rings to be used.

Each engagement member in the second set of engagement members has a first end and a second end. The first end can include a first drive face and a first non-drive face. The second end can include a second drive face and a second non-drive face. The first and second drive faces can be oriented to face in the same rotational direction. This differs from a conventional instantaneous selector assembly, wherein the non-drive faces on any given engagement member are oriented in opposite rotational directions, and therefore separate gear selector rings are required since the selector rings are not interchangeable. Having the non-drive faces of each engagement member in a selector ring face in the same rotational direction helps to enable a pair of identical selector rings to be used.

The first selector ring can include a first annular member, which connects the first set of engagement members together. Recesses can be formed in the first annular member to enable the second set of engagement members to pass through the first annular member. This facilitates relative translational movement between the selector rings, and enables the annular member to have a relatively large depth, which helps to improve the durability of the selector ring.

The second selector ring can include a second annular member, which connects the second set of engagement members together. Recesses can be formed in the second annular member to enable the first set of engagement members to pass through the second annular member. This facilitates relative translational movement between the selector rings, and enables the annular member to have a relatively large depth, which helps to improve the durability of the selector ring.

The first gear selector assembly can be arranged to provide torque support during a gear shift, to ensure that there is no loss of drive during the gear shift.

The second gear selector assembly can include a third selector ring. The actuator assembly can include a second shift fork assembly, the second shift fork assembly can include a third shift fork arranged to control axial movement of the third selector ring.

The actuator assembly can include a second shift collar mounted on a further shift rail. The second shift collar can include a second control member that engages with the second control slot, wherein the shift drum is arranged such that adjusting the rotational orientation of the second part of the shift drum adjusts the position of the second control member along the second control slot, which controls the axial position of the second shift collar with respect to the further shift rail.

Adjusting the axial position of the second shift collar on the further shift rail, can adjust the axial position of the third shift fork and third selector ring, with respect to the further shift rail.

The transmission system include a first input shaft that is directly connected to the output of a drive source. The transmission system include a second input shaft that is connected to the output of the drive source via a friction clutch. The second gear selector assembly can be mounted on the second input shaft. A third gear element can be rotatably mounted on the second input shaft. A fourth gear element can be rotatably mounted on the second input shaft.

The second gear selector assembly can be arranged to selectively lock each of the third and fourth gear elements for rotation with the second input shaft. By "directly" it is meant that there is no friction clutch in the drive line between the drive source and the first input shaft. The drive source can be any suitable source, such as a combustion engine or an electric motor. The actuator assembly can be arranged to move the third selector ring into engagement with the third gear element to lock the third gear element for rotation with the second input shaft. The actuator assembly can be arranged to move the third selector ring into engagement with the fourth gear element to lock the fourth gear element for rotation with the second input shaft.

Odd gears (e.g. $1^{st}$ gear, $3^{rd}$ gear, $5^{th}$ gear) can be grouped together in a first part of the transmission. Even gears (e.g. $2^{nd}$ gear, $4^{th}$ gear, $6^{th}$ gear) can be grouped together in a second part of the transmission. The second gear selector assembly can be arranged to select between odd and even gears by selectively creating torque pathways to the first and second parts of the transmission. For example, odd gears can be driveably connected to a second lay shaft. Even gears can be driveably connected to a sleeve that is rotatably mounted on the second lay shaft. The second gear selector assembly can be arranged to selectively create a first torque pathway to the second lay shaft. The second gear selector assembly can be arranged to selectively create a second torque pathway to the sleeve mounted on the second lay shaft. The odd side of the transmission can include $1^{st}$ gear, $3^{rd}$ gear, and $5^{th}$ gear. The odd side of the transmission can include further odd gears such as $7^{th}$ gear and $9^{th}$ gear. The even side of the transmission system can include even gear such as $2^{nd}$ gear, $4^{th}$ gear, and $6^{th}$ gear. The even side of the transmission system can include further even gears such as $8^{th}$ gear and $10^{th}$ gear.

The third gear selector assembly can include a further selector ring, and the actuator assembly can include a further shift fork assembly, the further shift fork assembly can include a further shift fork arranged to control axial movement of the further selector ring.

The actuator assembly can include a further shift collar mounted on an additional shift rail. The further shift collar can include a further control member that engages with the third control slot. The shift drum can be arranged such that adjusting the rotational orientation of the first part of the shift drum adjusts the position of the further control member along the third control slot, which controls the axial position of the further shift collar with respect to the additional shift rail.

Adjusting the axial position of the further shift collar on the additional shift rail, can adjust the axial position of the further shift fork and further selector ring, with respect to the additional shift rail.

The transmission system can include an output shaft. The third gear selector assembly can be mounted on one of the output shaft, the second lay shaft and a sleeve mounted on the second lay shaft. At least one further gear element can be rotatably mounted on the same shaft as third gear selector assembly. The third gear selector assembly can be arranged to selectively lock the at least one further gear element for rotation with the shaft on which it is mounted. In some embodiments, the third gear selector assembly is arranged to selectively lock fifth and sixth gear elements to the shaft on which it is mounted.

The third gear selector assembly can comprise a pre-select selector assembly, which is arranged to pre-select a new gear before the gear shift takes place. In practice, this typically means that a new gear is pre-selected by the third gear selector assembly prior to the first gear selector assembly and/or the second gear selector assembly changing its operational condition during a gear shift, for example before selecting a new gear element or moving to a neutral position.

The third gear selector assembly can include a further selector ring that is moveable into and out of engagement with the further gear element. The further selector ring can be moveable into and out of engagement with the fifth and sixth gear elements.

The further selector ring can comprise a gear element that is arranged to slide axially along the shaft on which it is mounted.

The transmission system can include at least one additional gear selector assembly, the additional gear selector assembly comprising a pre-select selector assembly, which is arranged to pre-select a new gear before the gear shift takes place; the additional gear selector assembly includes an additional selector ring, and the actuator assembly includes a further shift fork assembly, the further shift fork assembly including an additional shift fork arranged to control axial movement of the additional selector ring; wherein the actuator assembly includes an additional shift collar mounted on the additional shift rail, said additional shift collar including an additional control member that engages with a fourth control slot formed in the first part of shift drum, wherein the shift drum is arranged such that adjusting the rotational orientation of the first part of the shift drum adjusts the position of the additional control member along the fourth control slot, which controls the axial position of the additional collar with respect to the additional shift rail; wherein adjusting the axial position of the further shift collar on the additional shift rail, adjusts the axial position of the further shift fork and further selector ring, with respect to the additional shift rail.

According to another aspect there is provided a drive train including a drive source, a friction clutch device and a transmission system according to any configuration described herein. The friction clutch device can be a wet friction clutch or a dry friction clutch.

The invention has many advantages, which include:

- The transmission system is significantly less complex and easier to control than a DCT type transmission system, and is less complex and easier to control than an instantaneous type transmission system.
- The capacity of the synchronisers is small because the layout of the transmission means that the size of the inertia that has to be synchronised is relatively small. In DCTs the capacity of the synchronisers is significantly higher.
- Only one type of synchroniser is required, which reduces manufacturing costs. For DCTs it is often required to have many different types of synchronisers in different parts of the transmission.
- The transmission layout and shift strategies employed enables torque support to be provide during at least some gearshifts.
- The transmission layout is very compact. It is also versatile in the sense that it can be used front wheel drive vehicles, rear wheel drive vehicles and all-wheel drive vehicles.
- The layout uses many regular transmission components so existing production lines can easily be adapted to manufacture this transmission layout.
- The layout and shift strategies enables the torque in the transmission to be controlled during a gearshift in a manner that eliminates engagement torque spikes so it is not necessary for any of the gears to include dampers.

BRIEF DESCRIPTION OF THE DRAWINGS

Embodiments of the present invention will now be described, by way of example only, with reference to the accompanying drawings in which like references indicate equivalent features, wherein.

DETAILED DESCRIPTION

Figure 1:
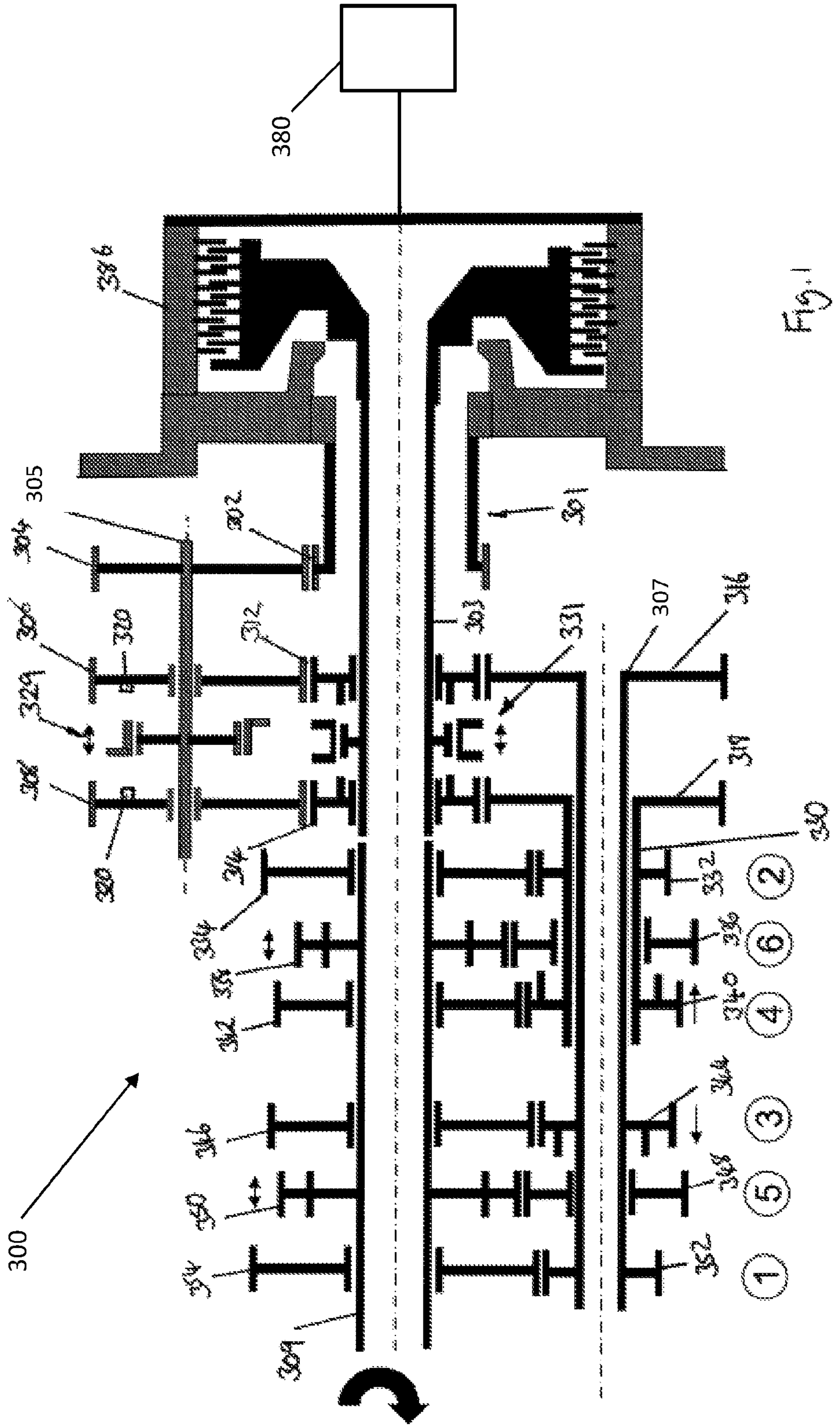
FIG. 1 is a schematic of a discrete ratio transmission system, suitable for use in a vehicle in accordance with an embodiment to the invention.
Figure 2:
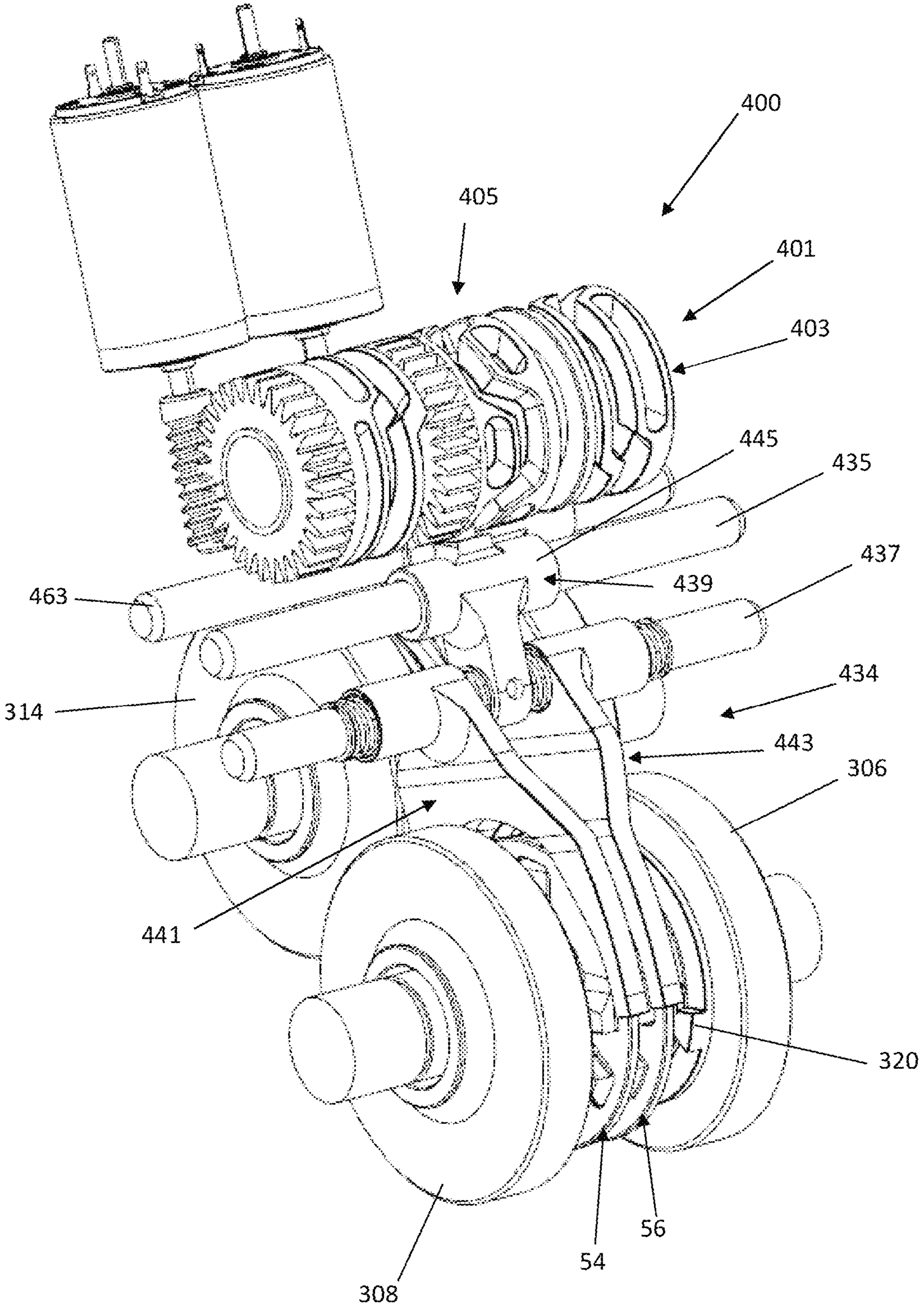
FIG. 2 is a diagrammatic isometric view, from the front, of two gear selector assemblies, associated gear elements showed diagrammatically, and an actuator assembly arranged to actuate the gear selector assembly, which are used in the transmission of FIG. 1.
Figure 3:
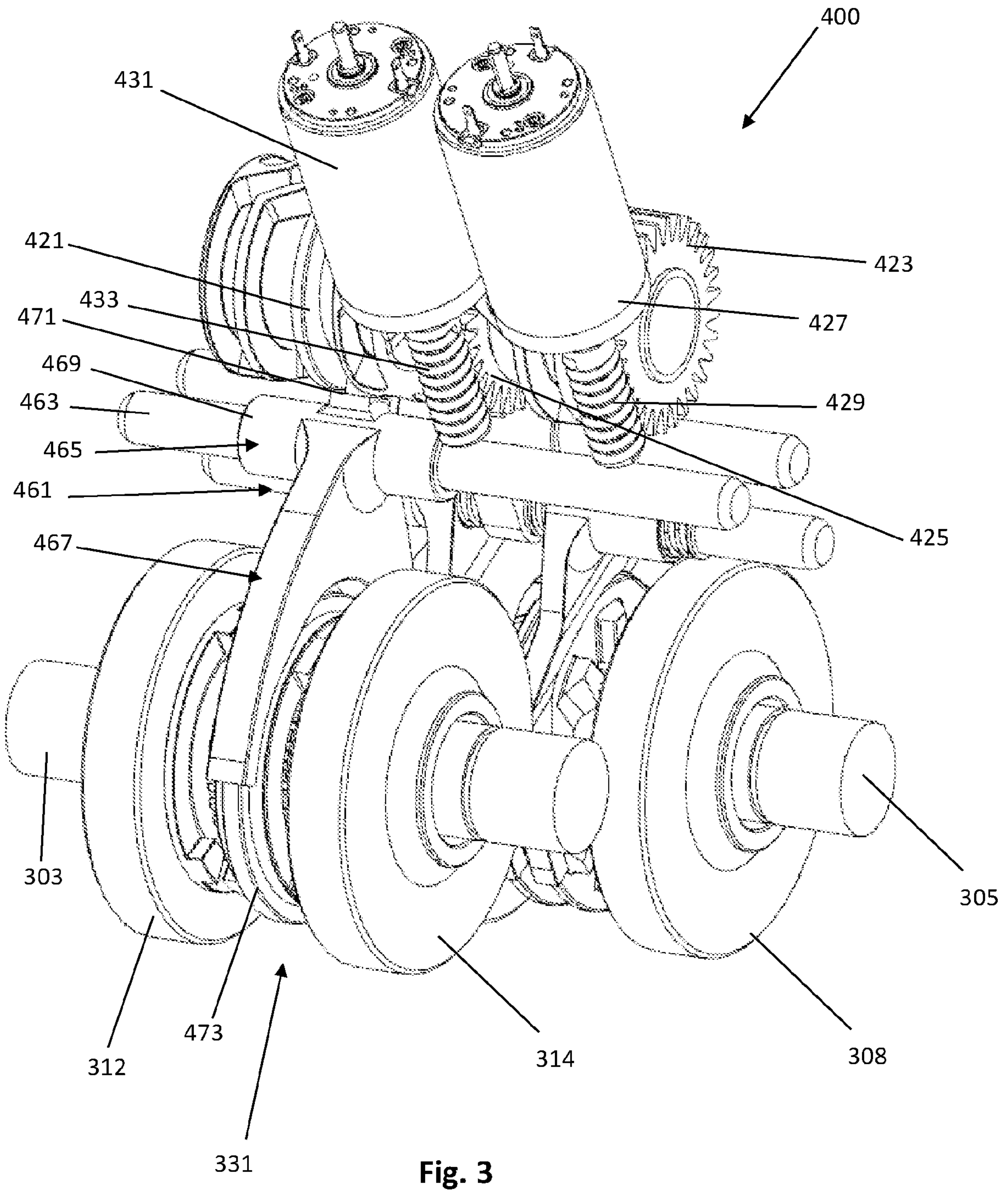
FIG. 3 is a diagrammatic isometric view, from the rear, of the gear selector assemblies, associated gear elements showed diagrammatically, and an actuator assembly of FIG. 2.

FIG. 1 shows a drive train, including a transmission system 300 in accordance with the invention, a friction clutch 386, such as a dry friction clutch and a drive source 380, such as a combustion engine or electric motor. The transmission system is a multi-speed transmission 300. FIG. 1 shows a six-speed transmission with odds and even gears grouped together. It will be appreciated by the skilled person that the transmission layout is scalable to any number of gears by add/subtracting gear trains on the odd and/or evens side. The transmission 300 shown is particularly suitable for vehicles, such as motorcycles.

The transmission system can be arranged as a fully automatic, semi-automatic or fully manual transmission.

The transmission system 300 includes a first input shaft 301 that is directly connected to the output of the drive source 380 and a second input shaft 303 that is connected to the output of the drive source 380 via the clutch 386.

The first input shaft 301 is tubular and is arranged to house a part of the second input shaft 303 in a co-axial fashion.

The transmission system includes a first lay shaft 305. Drive is transmitted from the first input shaft 301 to the first lay shaft 305 by a gear train comprising a pair of gear elements 302,304. Gear element 302 is fixed for rotation with the first input shaft. Gear element 304 is fixed for rotation with the first lay shaft 305. Gear element 302 meshes with gear element 304.

Two gear elements 306,308 are rotatably mounted on the first lay shaft 305 by bearings. Each of the gear elements 306,308 is selectively locked for rotation with the first lay shaft 305 by a first gear selector assembly 329.

The gear element 306 meshes with a gear element 312, which is rotatably mounted on the second input shaft 303 by a bearing. The gear element 308 meshes with a gear element 314, which is rotatably mounted on the second input shaft 303 via a bearing. The gear elements 312,314 are selectively locked for rotation with the second input shaft 303 by a second gear selector assembly 331. The second selector assembly 331 is a conventional type of gear selector assembly, such as a synchromesh selector assembly or standard selector ring. Each of the gear elements 312,314 includes appropriate engagement formations and/or synchronisers.

The transmission system 300 includes a further lay shaft 307 and an output shaft 309. The gear element 312 meshes with a gear element 316 fixed for rotation with the lay shaft 307. The gear element 314 meshes with a gear element 318 that is rotatably mounted on the lay shaft 307 via a sleeve 330 and bearings.

First to sixth gears are arranged to transfer torque between the lay shaft 307 and the output shaft 309. The odd gears are grouped together on a first side of the transmission and the even gears are grouped together on a second side of the transmission. When looking from right to left in FIG. 1 the gears are ordered as follows: $2^{nd}$, $6^{th}$, $4^{th}$, $3^{rd}$, $5^{th}$, $1^{st}$ $2^{nd}$ gear includes a gear element 332 fixed for rotation with the sleeve 330 and a gear element 334 rotatably mounted on the output shaft 309 via a bearing. $6^{th}$ gear includes a gear element 336 that is rotatably mounted on the sleeve 330 via a bearing and a gear element 338 that is fixed for rotation with the output shaft 309, and that is arranged to slide axially along the output shaft 309. $4^{th}$ gear includes a gear element 340 that is fixed for rotation with the sleeve 330 and is arranged to slide axially along the sleeve 330, and a gear element 342 that is rotatably mounted on the output shaft 309 via a bearing.

The gear element 338 acts as a first pre-select device and is arranged to selectively lock the gear elements 342 and 334 for rotation with the output shaft 309, by sliding into and out of engagement with those gear elements 342,334, thereby pre-selecting $4^{th}$ gear and $2^{nd}$ gear respectively.

The gear element 340 acts as a second pre-select assembly and is arranged to selectively lock the gear element 336 for rotation with the sleeve 330, thereby pre-selecting $6^{th}$ gear.

$3^{rd}$ gear includes a gear element 344 fixed for rotation with the lay shaft 307, and a gear element 346 rotatably mounted on the output shaft 309 via a bearing. Gear element 344 is arranged to slide axially along the lay shaft 307. $5^{th}$ gear includes a gear element 348 rotatably mounted on the lay shaft 307 via a bearing and a gear element 350 fixed for rotation with the output shaft 309. Gear element 350 is arranged to slide axially along the output shaft 309. $1^{st}$ gear includes a gear element 352 fixed for rotation with the lay shaft 307 and a gear element 354 rotatably mounted on the output shaft 354 via a bearing.

The gear element 344 acts as a pre-select assembly to selectively lock the gear element 348 for rotation with the lay shaft 307, by sliding axially into and out of engagement with that gear element, thereby pre-selecting $5^{th}$ gear. The gear element 350 acts as a pre-select assembly to selectively lock the gear elements 346,354 for rotation with the output shaft 309, thereby pre-selecting $3^{rd}$ gear and $1^{st}$ gear respectively.

The pre-select assemblies 340,344,350,358 are arranged in the manner of a conventional synchromesh selector device or dog clutch device. The gears that are selected by the pre-select assemblies 340,344,350,358 include the appropriate drive formations that can be engaged by the pre-select assemblies 340,344,350,358.

When the second selector assembly 331 engages gear element 312, a torque pathway is provided between the second input shaft 303, the lay shaft 307 and the odd side of the transmission (i.e. at least one of $1^{st}$, $3^{rd}$ and $5^{th}$ gears). When the second selector assembly 331 engages gear element 314, a torque pathway is provided between the second input shaft 303, the sleeve 330, and the even side of the transmission (i.e. at least one of $2^{nd}$, $4^{th}$ and $6^{th}$ gears). Thus the second selector assembly 331 is arranged to select between odd and even gears.

The first selector assembly 329 is arranged to engage a first set of drive formations 320 located on the gear element 306 and a second set of drive formations 320 located on the gear element 308 (see FIG. 1). The drive formations 320 on each gear element 306,308 each comprise a group of dogs located on respective side faces of the gear elements 306, 308. There are typically three dogs in each group 320. The dogs within a group are evenly circumferentially distributed about the lay shaft 305, i.e. the angles subtended between the centres of a pair of dogs is approximately 120 degrees. Three dogs are preferably used because the arrangement provides relatively large engagement windows, that is the spaces between the dogs, to receive engagement members from the first selector assembly 329. Also, three dogs provide inherent self-centring and even load distribution. Large engagement windows provide greater opportunities for the first selector assembly 329 to fully engage the gear elements 306,308.

Figure 4:
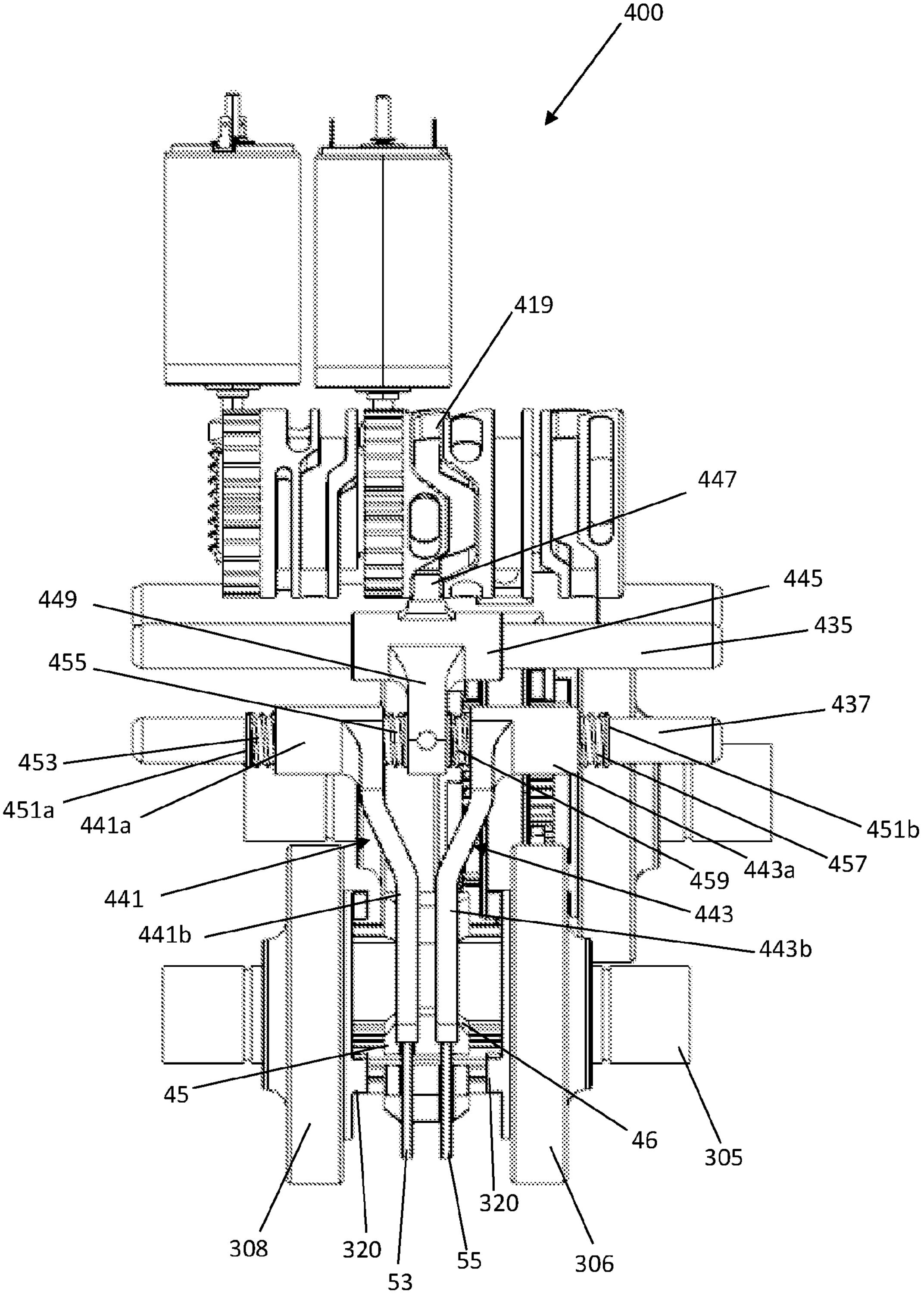
FIG. 4 is a diagrammatic front view of the gear selector assemblies, associated gear elements showed diagrammatically, and an actuator assembly of FIG. 2.
Figure 5:
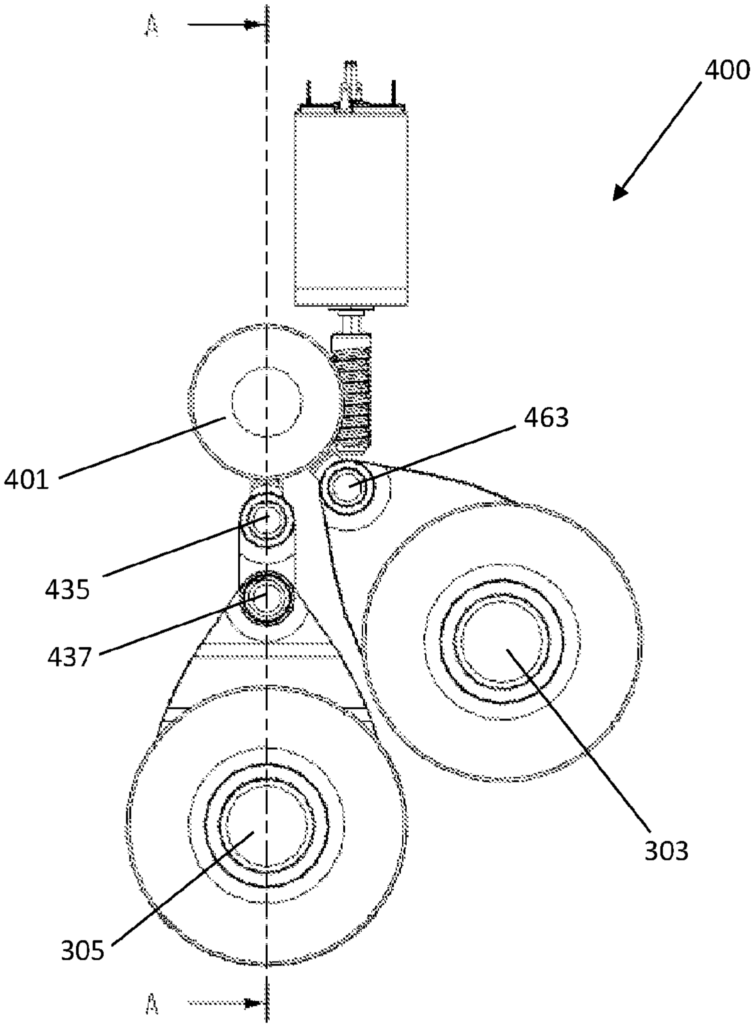
FIG. 5 is a diagrammatic side view of the gear selector assemblies, associated gear elements showed diagrammatically, and an actuator assembly of FIG. 2.
Figure 6:
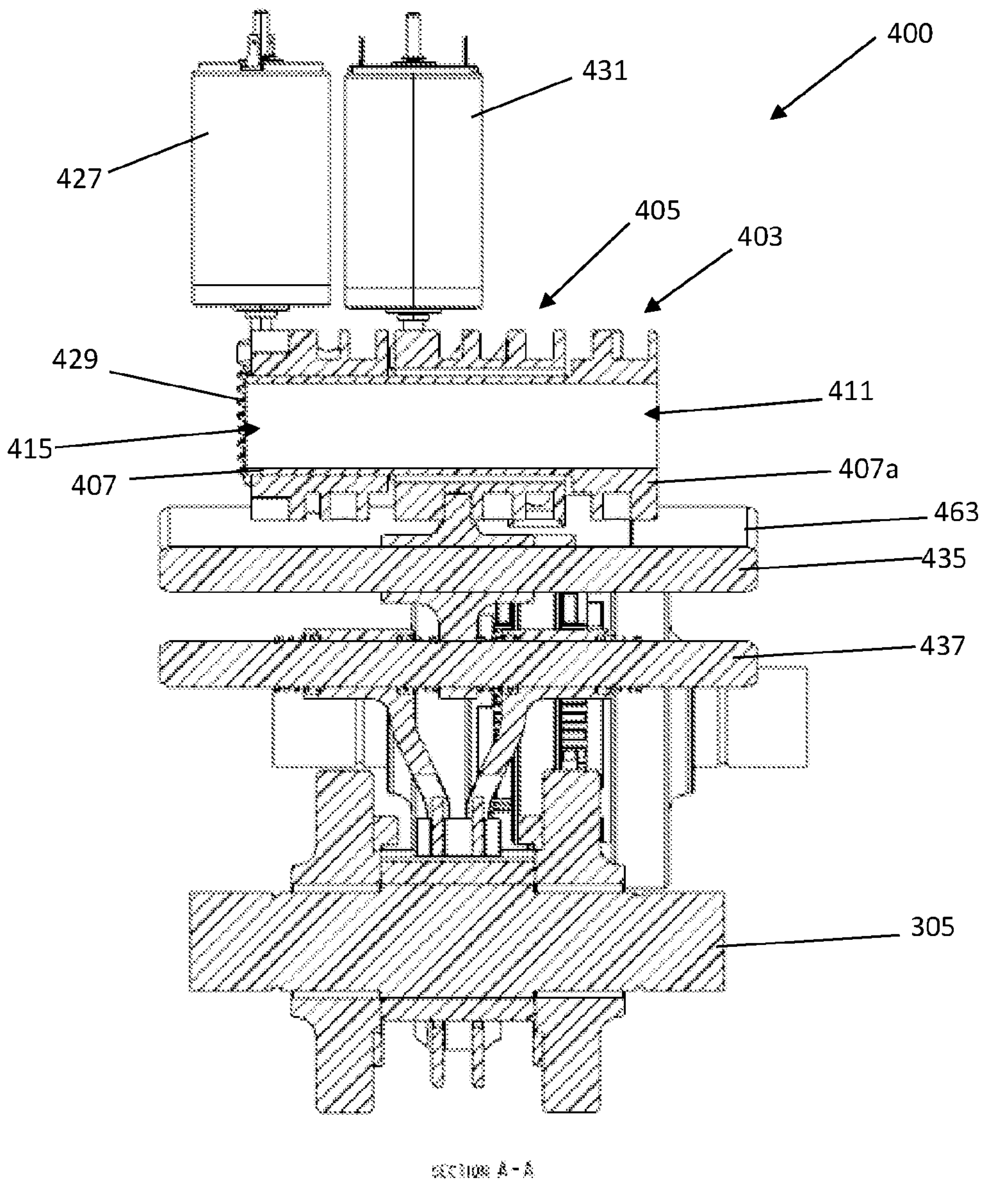
FIG. 6 is diagrammatic a cross-sectional view of the gear selector assemblies, associated gear elements showed diagrammatically, and an actuator assembly of FIG. 2.

The first selector assembly 329 is mounted on the lay shaft 305 between the drive formations 320 mounted on the gear elements 306,308 (see FIGS. 1 and 4).

Figure 8A:
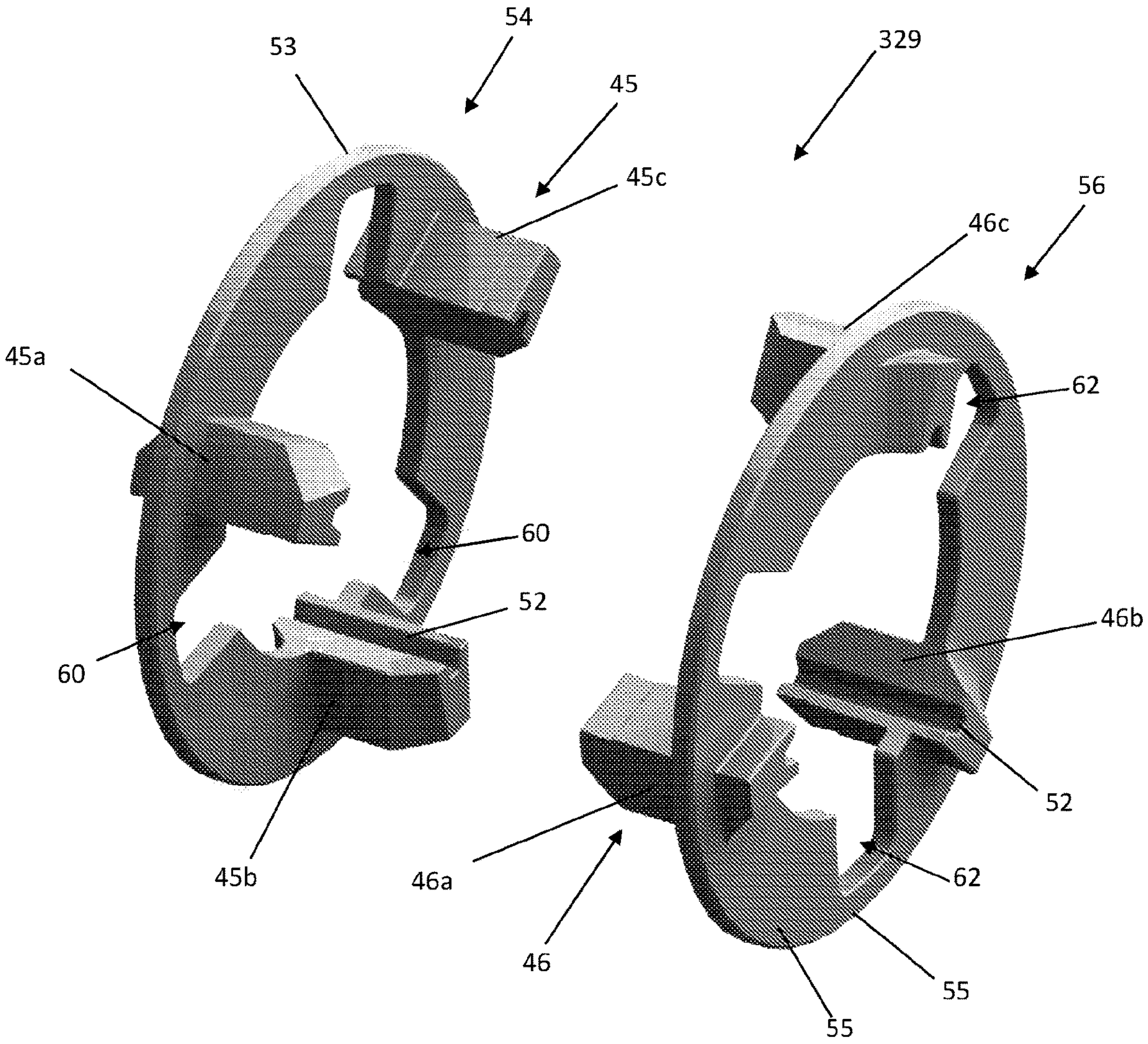
FIG. 8*a* is an isometric view of first and second gear selector rings from a first gear selector assembly shown in FIG. 2.
Figure 8B:
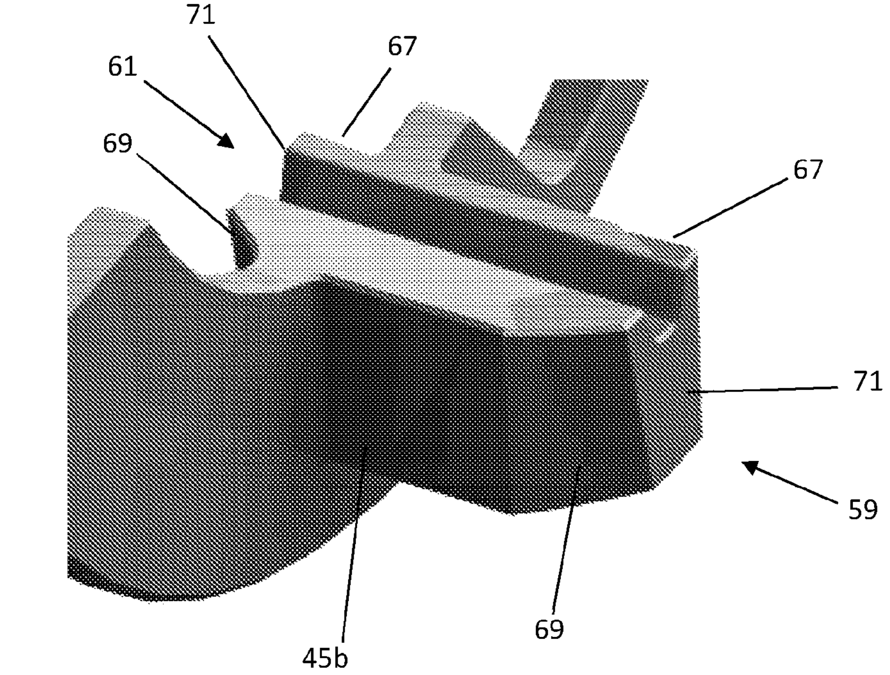
FIG. 8*b* is an enlarged isometric view of an engagement element from the first gear selector ring of FIG. 8*a;*
Figure 8C:
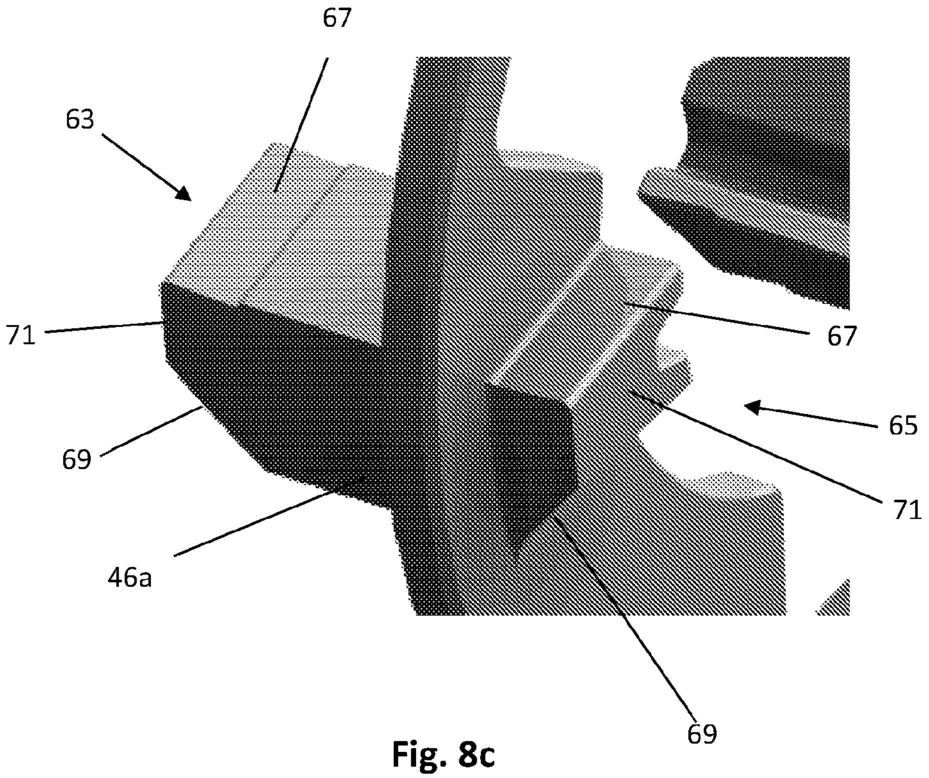
FIG. 8*c* is an enlarged isometric view of an engagement element from the second gear selector ring of FIG. 8*a;*
Figure 9:
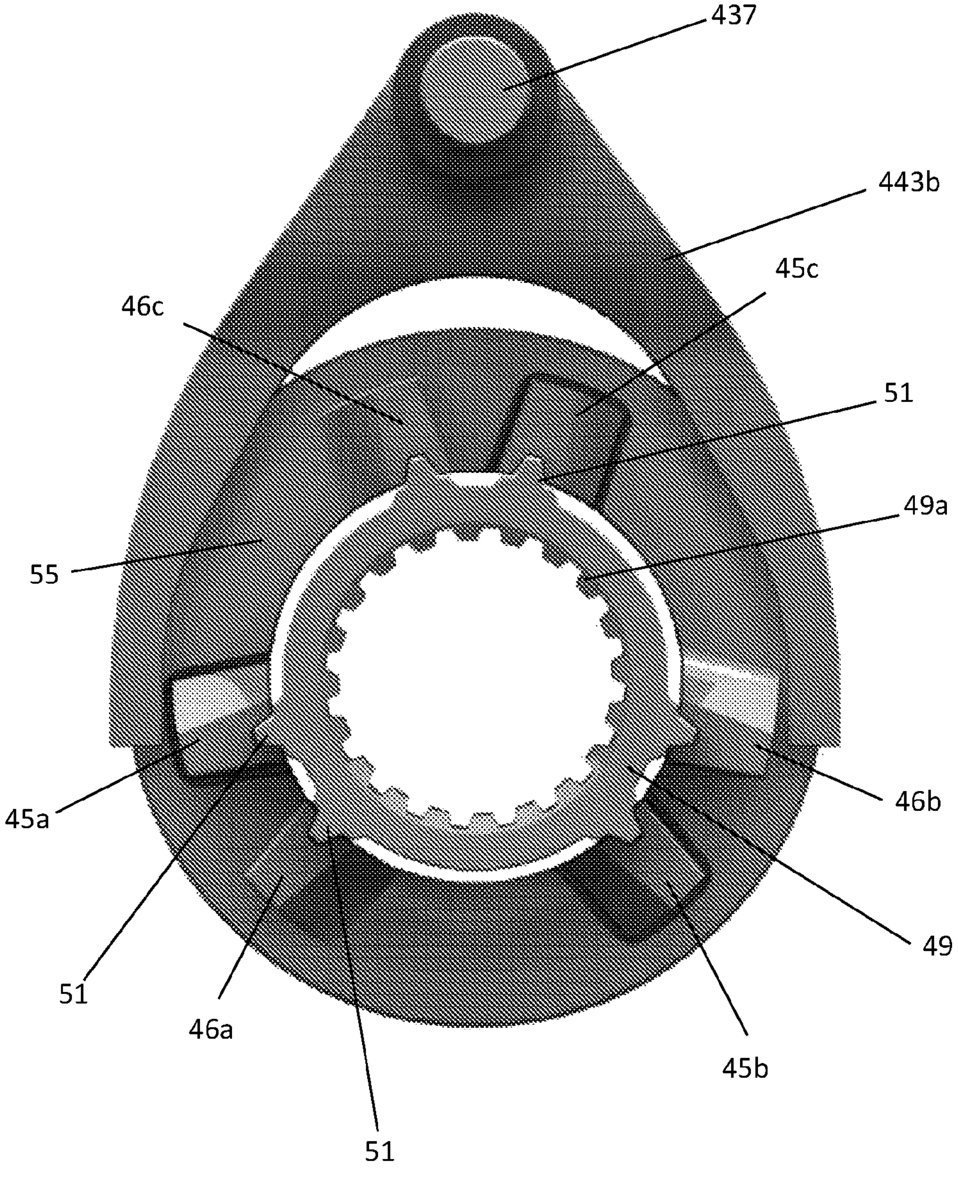
FIG. 9 is a side view of the pair of selector rings shown in FIG. 8 mounted on a hub and connected to an actuator fork.

The first gear selector assembly 329 includes first and second sets of engagement members 45,46 (see FIGS. 8 and 9). The first set of engagement members 45 comprises three members 45*a*-*c* that are evenly distributed about the lay shaft 305. The second set of engagement members 46 comprises three members 46*a*-*c* which are evenly distributed about the lay shaft 305.

Figure 7:
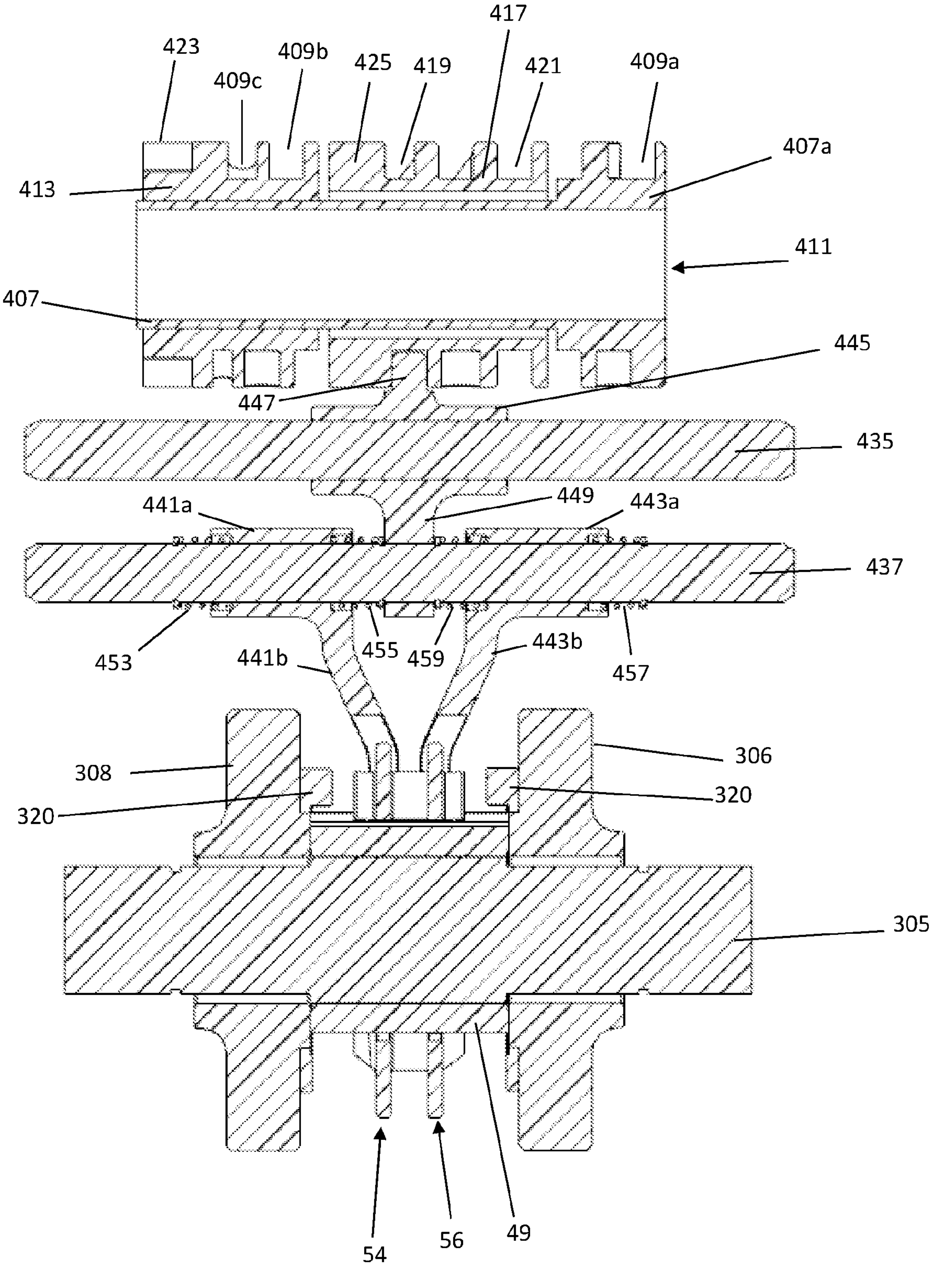
FIG. 7 is a diagrammatic enlarged view of part of FIG. 6.

The first and second sets of engagement members 45,46 are mounted on a support 49 which is fixed for rotation to the lay shaft 305 (see FIGS. 7 and 9). The sets of engagement members 45,46 are arranged to rotate with the lay shaft 305 but are able to slide axially along the support 49, and hence the lay shaft 305, in response to a switching action of an actuator assembly 400. To facilitate this, the support 49 includes six keys 51 formed on its curved surface each of which is arranged to engage a channel 52 formed in its respective engagement member 45*a*-*c*,46*a*-*c*.

The support 49 includes internal splines 49*a*, which are arranged to engage with external splines formed on the lay shaft 305. This provides a very robust connection between the support 49 and the lay shaft 305. The splined arrangement locks the support 49, and hence the first and second sets of engagement members 45,46 for rotation with the lay shaft 305.

The arrangement of the sets of engagement members 45,46 is such that members 45*a*-*c*,46*a*-*c* of a particular set are located on alternate keys 51 and the member sets 45,46 can slide along the support 49. The engagement members 45*a*-*c* in the first set are rigidly connected to each other by a first annular connector member 53 and move as a unit. Thus the first set of engagement members 45*a*-*c* and the first annular connector member 53 together form a first gear selector ring 54. The engagement members 45*a*-*c* in the first set are evenly distributed around the first annular connector member 53. The engagement members 46*a*-*c* in the second set are rigidly connected to each other by a second annular connector member 55 and move as a unit. Thus the second set of engagement members 46*a*-*c* and the second annular connector member 55 together form a second gear selector ring 56. The engagement members 46*a*-*c* in the second set are evenly distributed around the second annular connector member 55. Each set of engagement members 45,46 can move translationally relative to one another. When there is relative movement between the first and second sets of engagement members 45,46, the first annular connector member 53 moves over the second set of engagement members 46 and the second annular connector member 55 moves over the first set of engagement members 45.

Recesses 60,62 are formed in the annular connect members 53,55 respectively. The recesses 60, are sized, shaped and located to receive respective second engagement members 46. The recesses 62, are sized, shaped and located to receive respective first engagement members 45. Thus the number of recesses 60,62 matches the number of engagement members 45,46 to be received. The recesses 60,62 facilitate relative movement of the sets of engagement members 45,46.

The annular connector member 53 can be positioned with respect to its engagement members 45, such that, the length of the part of each engagement member on a first side of the connector member 53 is greater than the length of the part of each engagement member on a second side of the connector member. Likewise, the annular connector member 55 can be positioned with respect to its engagement members 46, such that, the length of the part of each engagement member on a first side of the annual connector member 55 is greater than the length of the part of each engagement member on a second side of the connector member. For example, the parts of the engagement members on the first side of the respective connect member 53,55 can be around 3 to 4 times the length of the part of the parts of the engagement members on the second side of the respective connect member 53,55.

Each engagement member 45*a*-45*c* in the first set has a first end 59 arranged to engage the first group of dogs 320 attached to the gear element 306 and a second end 61 arranged to engage the second group of dogs 320 attached to the gear element 308. The first end 59 of each first engagement member 45*a*-*c* is arranged to selectively engage the first group of dogs 320 during deceleration (reverse torque direction) of the gear element 306 and the second end 61 is arranged to selectively engage the second group of dogs 320 during deceleration (reverse torque direction) of the gear element 308. For each engagement member 46*a*-*c* in the second set, the first end 63 is arranged to engage the second group of dogs 320 during acceleration (forward torque direction) of the gear element 308 and the second end 65 is arranged to engage the first group of dogs 320 during acceleration (forward torque direction) of the gear element 306.

With this arrangement, the first and second selector rings can be arranged identically to one another. This contrasts to traditional instantaneous type selector assemblies, wherein the selector rings are arranged opposite handed to one another. This arrangement reduces the manufacturing costs of the first selector assembly 329, since it is only necessary to have one type of selector ring 54,56.

When both the first and second sets of engagement members 45,46 engage one of the first and second sets of dogs 320, drive is transmitted between the respective gear element 306,308 and the first gear selector assembly 329 in the forward and reverse torque directions.

The first and second ends 59,61,63,65 of each engagement member includes a drive face 67 for drivingly engaging the respective dogs 320, a non-driving face in the form of a ramp 69, an end face 71 (see FIG. 8). The end faces 71 limit the axial movement of the engagement members 45*a*-*c*,46*a*-*c*. In some arrangements, side faces of the dogs 320 can be inclined. In this instance, the drive faces 67 may be angled to complement the sides of the dogs 320 so that as the engagement members 45*a*-*c*,46*a*-*c* rotate into engagement, there is face-to-face contact to reduce wear. The purpose of the non-driving faces 69 is to prevent locking engagement between the engagement members and the dogs 320. Each non-driving face 69 is preferably helically formed and slopes away from its respective end face 71. The angle of inclination of the non-driving face 69 can be such that the longitudinal distance between the edge of the non-driving face furthest from the end face 71 and the plane of the end face 71 is larger than the height of the dogs 320. This helps to ensure that the transmission does not lock up when there is relative rotational movement between the engagement members 45*a-c*,46*a-c* and the dogs 320 that causes the non-driving faces 69 to move towards the respective dogs 320. The dogs 320 do not crash into the sides of the engagement members 45*a-c*,46*a-c* but rather engage the non-driving faces 69. Further relative rotational movement between the dogs 320 and the engagement members 45*a-c*, 46*a-c* causes the dogs 320 to slide across the non-driving faces 69 and the sloped surfaces of the non-driving faces cause the engagement members 45*a-c*,46*a-c* to move axially along the lay shaft 305 away from the respective dogs 320 so that the transmission does not lock up. Thus the non-driving faces 69 provide a ratcheting effect and the first gear selector assembly 329 is arranged to slip relative to the gear elements 306,308 respectively under certain operational conditions.

Thus the first selector assembly 329 is arranged to selectively engage the gear element 306 with the following operational modes: lock the gear element 306 for rotation with the shaft 305 in forward and reverse torque directions, lock the gear element 306 for rotation with the shaft 305 in the forward torque direction and not lock in the reverse torque direction; and lock the gear element 306 with rotation with the shaft 305 in the reverse torque direction and not lock in the forward torque direction.

When gear element 306 is locked for rotation in forward and reverse torque directions (engaged by the first and second sets of engagement members 45,46), one of the first and second sets of engagement members 45,46 is in a loaded condition and the other of the first and second sets of engagement members 45,46 are in an unloaded condition. The actuator assembly 400 is arranged to selectively move the unloaded set of engagement members 45,46 out of engagement with the currently engaged gear element 308, for example to a neutral position.

The first selector assembly 329 is arranged to selectively engage the gear element 308 with the following operational modes: lock the gear element 308 for rotation with the shaft 305 in forward and reverse torque directions, lock the gear element 308 for rotation with the shaft 305 in the forward torque direction and not lock in the reverse torque direction; and lock the gear element 308 with rotation with the shaft 305 in the reverse torque direction and not lock in the forward torque direction.

When gear element 308 is locked for rotation in forward and reverse torque directions (engaged by the first and second sets of engagement members 45,46), one of the first and second sets of engagement members 45,46 is in a loaded condition and the other of the first and second sets of engagement members 45,46 are in an unloaded condition. The actuator assembly 400 is arranged to selectively move the unloaded set of engagement members 45,46 out of engagement with the currently engaged gear element 306, for example to a neutral position. The first selector assembly 329 can be in a neutral (non-engaged) condition with respect to gear elements 306,308.

When the first and second sets of members 45,46 are fully engaged with the gear element 306, a dog 320 is located between each pair of the drive faces 67 of the first ends 59 of the first set of members 45 and the drive faces 67 of the second end 65 of the second set of members 46.

When the first and second sets of members 45,46 are fully engaged with the gear element 308, a dog 320 is located between the drive faces 67 of the second ends 63 of the first set of members 45 are adjacent the drive faces 67 of the first ends 61 of the second set of member 46. The dimensions of the dogs 320 and the ends 59,61,63,65 of the engagement members are such that there is little movement of each dog between the drive face 67 of the acceleration member and the drive face 67 of the deceleration member when the gear element 306,308 moves from acceleration to deceleration, or vice versa, to ensure that there is little or no backlash in the gear. Backlash is the lost motion experienced when the dog moves from the drive face 67 of the acceleration member to the drive face 67 of the deceleration member when moving from acceleration to deceleration, or vice versa. A conventional dog-type transmission has approximately 30 degrees of backlash. A typical transmission for a car in accordance with the current embodiment has backlash of less than five degrees.

The transmission system includes an actuator assembly 400 that is arranged to control operation of the first selector assembly 329, the second selector assembly 331 and at least one of the pre-select assemblies 340,344,350,358, and typically a plurality of the pre-select assemblies 340,344,350, 358. In some arrangements, the actuator assembly 400 is arranged to control operation of each of the pre-select assemblies 340,344,350,358.

The actuator assembly 400 includes a shift drum 401. The shift drum 401 comprises a first part 403 and a second part 405. The first part comprises a shaft 407 having a flange 407*a* located at a first end 411 of the shaft. A sleeve 413 is mounted on the shaft 407 towards a second end 415 of the first shaft 407. The sleeve 413 is fixed for rotation with the shaft 407, for example by a splined arrangement. A plurality of control slots 409 are formed in the first part 403. For example, a control slot 409*a* can be formed in an outer curved surface of the flange 407*a*. A plurality of control slots 409*b-c* can be formed in the outer curved surface of the sleeve 413. Typically, the number of control slots 409 formed in the outer curved surface matches the number of pre-selector assemblies 340,344,350,358 (only 3 controls slots 409*a-c* are shown in the figures for illustrative purposes). The second part comprises a sleeve 417, which is rotatably mounted on the shaft 407 by bearings. A plurality of control slots 419,421 are formed in the outer curved surface of the sleeve 417.

The actuator assembly 400 includes a drive system that is arranged to selectively rotate the first part 403 of the shift drum and the second part 405 of the shift drum, wherein the second part 405 of the shift drum is rotated independently from the first part 403 of the shift drum. The first part 403 includes a gear element 423, which is fixed for rotation with the shaft 407 and sleeve 413. The second part 405 includes a gear element 425 that is fixed for rotation with the sleeve 417. The drive system includes a first electric motor 427 and a first worm gear 429. The first worm gear is in meshing engagement with the gear element 423. The first electric motor is arranged to selectively rotate the first part 403 (shaft 407 and sleeve 413) by driving the first worm gear 429, which in turn rotates gear element 423. The drive system includes a second electric motor 431 and a second worm gear 433. The second worm gear 433 is in meshing engagement with the gear element 425. The second electric motor is arranged to selectively rotate the second part 405 (sleeve 417) by driving the second worm gear 433, which in turn rotates gear element 425. A control system and/or switching arrangement (not shown) can be used to control operation of the first and second electric motors 427,431.

The actuator assembly 400 includes a first shift fork assembly 434, which is arranged to control operation of the first selector assembly 329. The first shift fork assembly 434 includes: a shift rail 435, a shift rail 437, a shift collar 439, a first shift fork 441 and a second shift fork 443.

The shift collar 439 includes a sleeve 445 that is mounted on the shift rail 435, and is arranged to slide axially along the shift rail 435. The shift collar 439 includes a control member 447, that protrudes radially outwards from the sleeve 445. One end of the control member 447 is located in the control slot 419 formed in the sleeve 417. As the sleeve 417 rotates, the control member 447 travels along the control slot 419, and since the control slot 419 is tortuous, the axial position of the shift collar 439 with respect to the shift rail 435 is adjusted. The shift collar 439 includes an arm 449 that protrudes radially outwards from the sleeve 445 in a direction that is generally opposite to the direction to which the control member 447 protrudes. The arm 449 includes a through hole, and the shift rail 437 passes through the hole. The arm 449 is fixed to the shift rail 437, for example the arm can be pinned to the shift rail 437. As the axial position of the sleeve 445 is adjusted with the respect to the shift rail 435, likewise the axial position of the shift rail 437 is adjusted.

The first shift fork 441 is arranged to control operation of the first set of engagement members 45. The first shift fork 441 includes a sleeve 441*a* and a forked member 441*b*. The sleeve 441*a* is mounted on shift rail 437 between a first stop 451*a* and the arm 449. A helical spring 453 is mounted between the first stop 451*a* and the sleeve 441*a* and a helical spring 455 is located between the sleeve 441*a* and the arm 449. The forked member 441*b* engages the first annular connector member 53, and is arranged to adjust the axial position of the first set of engagement members 45 with respect to the first lay shaft 305, thereby selectively moving the first set of engagement members 45 into and out of engagement with the dogs 320 on gear elements 306,308 mounted on the first lay shaft 305. The helical springs 453,455 are arranged to bias the first shift fork 441 to a neutral position, i.e. a position wherein the first set of engagement members 45 is not in engagement with either of its gear elements 306,308. The helical springs 453,455 also dampen movement of the first shift fork 441.

The second shift fork 443 is arranged to control operation of the second set of engagement members 46. The second shift fork 443 includes a sleeve 443*a* and a forked member 443*b*. The sleeve 443*a* is mounted on shift rail 437 between a second stop 451*b* and the arm 449. A helical spring 457 is mounted between the second stop 451*b* and the sleeve 443*a* and a helical spring 459 is located between the sleeve 443*a* and the arm 449. The forked member 443*b* engages the second annular connector member 55, and is arranged to adjust the axial position of the second set of engagement members 46 with respect to the first lay shaft 305, thereby selectively moving the second set of engagement members 46 into and out of engagement with the dogs 320 on gear elements 306,308 mounted on the first lay shaft 305. The helical springs 457,459 are arranged to bias the second shift fork 443 to a neutral position, i.e. a position wherein the second set of engagement members 46 is not in engagement with either of its gear elements 306,308. The helical springs 457,459 also dampen movement of the second shift fork 443.

The selector assembly 400 includes a second shift fork assembly 461, which is arranged to control operation of the second selector assembly 331. The second shift fork assembly 461 includes: a shift rail 463, a shift collar 465, and a third shift fork 467.

The shift collar 465 includes a sleeve 469 that is mounted on the shift rail 463, and is arranged to slide axially along the shift rail 463. The shift collar 465 includes a control member 471, that protrudes radially outwards from the sleeve 469. One end of the control member 471 is located in the control slot 421 formed in the sleeve 417. As the sleeve 417 rotates, the control member 471 travels along the control slot 421, and since the control slot 421 is tortuous, the axial position of the shift collar 465 with respect to the shift rail 463 is adjusted. The third shift fork 467 protrudes radially outwards from the sleeve 469 in a direction that is generally opposite to the direction to which the control member 471 protrudes.

The third shift fork 467 is arranged to control operation of a conventional selector ring 473, which is part of the second selector assembly 331. As the sleeve 469 moves axially along the shift rail 463, the axial position of the selector ring 473 is adjusted with respect to the second input shaft 303, to selectively engage gear elements 312, 314, to selectively lock those gear elements 312,314 for rotation with the second input shaft 303. In a condition wherein the selector ring 473 engages gear element 312, a torque path is created between the second input shaft 303 and the odd gears ($1^{st}$ gear, $3^{rd}$ gear, and $5^{th}$ gear), the actual gear selected being determined by the positions of pre-select assemblies 344, 350. In a condition wherein the selector ring 473 engages gear element 314, a torque path is created between the second input shaft 303 and the even gears ($2^{nd}$ gear, $4^{th}$ gear, and $6^{th}$ gear), the actual gear selected being determined by the positions of the pre-select assemblies 338,340.

Thus it is apparent that the rotational orientation of the second part of 405 of the shift drum determines the operational positions of the first, second and third shift forks 441,443,467, and hence the operational conditions of the first and second selector assemblies 329,331.

A plurality of shift forks (not shown) that are operably connected to a respective one of the control slots 409*a-c* in the first part 403 of the shift drum, are arranged to adjust the axial positions of the pre-select assemblies 338,340,344, 350. Thus the rotational orientation of the first part 403 of the shift drum determines the operational positions of the plurality of shift forks, and hence the operational positions of at least some, and preferably each, of the pre-select assemblies 338,340,344,350. Accordingly, in some embodiments, only a single shift drum 401 is required for the entire transmission.

The transmission provides torque support during power on up gear shifts, power on down gear shifts, power off gear shifts and power off down gear shifts. Thus there is no loss of drive to the output shaft when shifting gear. Thus the transmission provides seamless shifts for all main shift types by pre-selecting the appropriate gear and then controlling torque using the first and second selector devices 329,331. A substantially shock free engagement can be provided by synchronising the speed of the drive source and/or clutch with the new gear prior to making the shift.

Some example shift sequences, and relative positions of the selector assemblies are set out in the tables below. In the tables below, for the first selector assembly 329, "N" is a neutral condition, "E" indicates gear element 308 is engaged, and "O" indicates that gear element 306 is engaged. For the second selector assembly 331, "E" indicates that gear element 314 is engaged and "O" indicates that gear element 312 is engaged. The control slots 409*a-c* in the first part 403 of shift drum, and the control slots 419,421 in the second part 405 of the shift drum are arranged to operate their respective selector assemblies accordingly.

TABLE 1

| Power on up shift $2^{nd}$ gear to $3^{rd}$ gear | | | | | |
|---|---|---|---|---|---|
| Description | Clutch | Pre-select odd | Pre-select even | First Selector 329 | O/E Second Selector 331 |
| Drive in $2^{nd}$ | closed | $1^{st}$ | $2^{nd}$ | N | E |
| Up shift request - power on | | | | | |
| Pre-select (if required) | closed | $3^{rd}$ | $2^{nd}$ | N | E |
| Engage Z rail to $2^{nd}$ (0 delta speed) | closed | $3^{rd}$ | $2^{nd}$ | E | E |
| Open clutch | open | $3^{rd}$ | $2^{nd}$ | E | E |
| Sync clutch to $3^{rd}$ | open | $3^{rd}$ | $2^{nd}$ | E | O |
| Clutch torque to engine torque | Close to engine T | $3^{rd}$ | $2^{nd}$ | E | O |
| Z rail to N (ring retained) | hold = engine T | $3^{rd}$ | $2^{nd}$ | N | O |
| Sync engine to $3^{rd}$ | hold = engine T | $3^{rd}$ | $2^{nd}$ | N | O |
| Close clutch | closed | $3^{rd}$ | $2^{nd}$ | N | O |
| Drive in $3^{rd}$ | closed | 3rd | 2nd | N | O |

TABLE 2

| Power on down shift $2^{nd}$ gear to $1^{st}$ gear | | | | | |
|---|---|---|---|---|---|
| Description | Clutch | Pre-select odd | Pre-select even | First Selector 329 | O/E Second Selector 331 |
| Drive in $2^{nd}$ | closed | $3^{rd}$ | $2^{nd}$ | N | E |
| Down shift request - power on | | | | | |
| Pre-select (if required) | closed | $1^{st}$ | $2^{nd}$ | N | E |
| Clutch torque to engine Torque | open to engine T | $1^{st}$ | $2^{nd}$ | N | E |
| Sync engine to $1^{st}$ speed | hold = engine T (at request) | $1^{st}$ | $2^{nd}$ | N | E |
| Engage Z rail to $1^{st}$ (0 delta speed) | hold = engine T | $1^{st}$ | $2^{nd}$ | O | E |
| Open clutch | open | $1^{st}$ | $2^{nd}$ | O | E |
| Sync clutch to $1^{st}$ | open | $1^{st}$ | $2^{nd}$ | O | O |
| Close clutch | closed | $1^{st}$ | $2^{nd}$ | O | O |
| Z rail to N | closed | $1^{st}$ | $2^{nd}$ | N | O |
| Drive in $1^{st}$ | closed | $1^{st}$ | $2^{nd}$ | N | O |

TABLE 3

| Power off up shift $2^{nd}$ gear to 3rd gear | | | | | |
|---|---|---|---|---|---|
| Description | Clutch | Pre-select odd | Pre-select even | First Selector 329 | O/E Second Selector 331 |
| Overrun in $2^{nd}$ | closed | $1^{st}$ | $2^{nd}$ | N | E |
| Up shift request - power off | | | | | |
| Pre-select (if required) | closed | $3^{rd}$ | $2^{nd}$ | N | E |
| Clutch torque to engine Brake Torque | open to engine BT | $3^{rd}$ | $2^{nd}$ | N | E |
| Synch engine to $3^{rd}$ | modulate to sync | $3^{rd}$ | $2^{nd}$ | N | E |
| Engage Z rail to $3^{rd}$ (0 delta speed) | hold = to engine BT | $3^{rd}$ | $2^{nd}$ | O | E |
| Open clutch | open | $3^{rd}$ | $2^{nd}$ | O | E |
| Sync clutch to $3^{rd}$ | open | $3^{rd}$ | $2^{nd}$ | O | O |
| Close clutch | closed | $3^{rd}$ | $2^{nd}$ | O | O |

TABLE 3-continued

| Power off up shift $2^{nd}$ gear to 3rd gear | | | | | |
|---|---|---|---|---|---|
| Description | Clutch | Pre-select odd | Pre-select even | First Selector 329 | O/E Second Selector 331 |
| Z rail to N | closed | $3^{rd}$ | $2^{nd}$ | N | O |
| Overrun in $3^{rd}$ | closed | $3^{rd}$ | $2^{nd}$ | N | O |

TABLE 4

| Power off down shift $2^{nd}$ gear to $1^{st}$ gear | | | | | |
|---|---|---|---|---|---|
| Description | Clutch | Pre-select odd | Pre-select even | First Selector 329 | O/E Second Selector 331 |
| Overrun in $2^{nd}$ | closed | $3^{rd}$ | $2^{nd}$ | N | E |
| Down shift request - power off | | | | | |
| Pre-select (if required) | closed | $1^{st}$ | $2^{nd}$ | N | E |
| Engage Z rail to $2^{nd}$ (0 delta speed) | closed | $1^{st}$ | $2^{nd}$ | E | E |
| Open clutch | open | $1^{st}$ | $2^{nd}$ | E | E |
| Sync clutch to $1^{st}$ | open | $1^{st}$ | $2^{nd}$ | E | O |
| Clutch torque to engine brake torque | close to engine BT | $1^{st}$ | $2^{nd}$ | E | O |
| Z rail to N (ring retained) | hold = to engine BT | $1^{st}$ | $2^{nd}$ | N | O |
| Sync engine to $1^{st}$ | modulate to sync | $1^{st}$ | $2^{nd}$ | N | O |
| Close clutch | closed | $1^{st}$ | $2^{nd}$ | N | O |
| Overrun in $1^{st}$ | closed | $1^{st}$ | $2^{nd}$ | N | O |

It will be appreciated by the skilled person that modifications can be made to the above embodiments that fall within the scope of the invention, for example the transmission can include a different number of gears, such as a 7-speed, 8-speed, 9-speed or 10-speed transmission.

The number of control slots 409 formed in the first part 403 of the shift drum can be different. The number of control slots 409 formed in the first part 403 of the shift drum can be different from the number or pre-selector assemblies. Additional shift drums may be required when a larger number of pre-select gear selector assemblies are required.

The description presents exemplary embodiments and, together with the drawings, serves to explain principles of the invention. However, the scope of the invention is not intended to be limited to the precise details of the embodiments, since variations will be apparent to a skilled person and are deemed also to be covered by the claims. Terms for components used herein should be given a broad interpretation that also encompasses equivalent functions and features. In some cases, several alternative terms (synonyms) for structural features have been provided but such terms are not intended to be exhaustive.

Descriptive terms should also be given the broadest possible interpretation; e.g. the term “comprising” as used in this specification means “including” such that interpreting each statement in this specification that includes the term “comprising”, features other than that or those prefaced by the term may also be present. Related terms such as “comprise” and “comprises” are to be interpreted in the same manner. Directional terms such as “vertical”, “horizontal”, “up”, “down”, “upper” and “lower” may be used for convenience of explanation usually with reference to the illustrations and are not intended to be ultimately limiting if an equivalent function can be achieved with an alternative dimension and/or direction.

The description herein refers to embodiments with particular combinations of configuration steps or features, however, it is envisaged that further combinations and cross-combinations of compatible steps or features between embodiments will be possible. Indeed, isolated features may function independently as an invention from other features and not necessarily require implementation as a complete combination. Any feature from an embodiment can be isolated from that embodiment and included in any other embodiment.

The invention claimed is:

1. A transmission system, including:

a first gear selector assembly, wherein the first gear selector assembly including a first selector ring and a second selector ring, the first and second selector rings being movable translationally relative to one another;

the first selector ring including a first set of engagement members fixed together by a first annular member, and each engagement member in the first set includes a first part located on a first side of the first annular member and a second part located on a second side of the first annular member, each first part having a first drive face oriented generally in a first rotational direction and a first non-drive face oriented generally in a second rotational direction, and each second part includes a second drive face oriented generally in the first rotational direction and a second non-drive face oriented generally in the second rotational direction; and the second selector ring including a second set of engagement members fixed together by a second annular member, and each engagement member in the second set includes a first part located on a first side of the second annular member and a second part located on a second side of the second annular member, each first part having a first drive face oriented generally in the second rotational direction and a first non-drive face oriented generally in the first rotational direction, and each second part includes a second drive face oriented generally in the second rotational direction and a second non-drive face oriented generally in the first rotational direction;

wherein the first selector ring is identical to the second selector ring.

2. The transmission system of claim 1, wherein the engagement members in the first set of engagement members are angularly distributed evenly about the first annular member; and/or the engagement members in the second set of engagement members are angularly distributed evenly about the second annular member.

3. The transmission system of claim 1, the first selector ring includes a first set of recesses formed through the first annular member, wherein each recess in the first set of recesses is sized, shaped and positioned to receive a respective one of the engagement members in the second set of engagement members; and/or the second selector ring includes a second set of recesses formed through the second annular member, wherein each recess in the second set of recesses is sized, shaped and positioned to receive a respective one of the engagement members in the first set of engagement members.

4. The transmission system of claim 1, including an actuator assembly arranged to control movement of the first and second selector rings, wherein the first selector assembly is mounted on a shaft, a first gear element is rotatably mounted on the shaft, a second gear element is rotatably mounted on the shaft, and the first selector assembly is arranged to selectively lock the first and second gear elements for rotation with the shaft.

5. The transmission system of claim 4, wherein;

the first gear selector assembly is arranged to selectively engage the first gear element with the following operational modes:

lock the first gear element for rotation with the shaft in forward and reverse torque directions;

lock the first gear element for rotation with the shaft in the forward torque direction and not lock in the reverse torque direction; and lock the first gear element for with rotation with the shaft in the reverse torque direction and not lock in the forward torque direction; and/or the first gear selector assembly is arranged to selectively engage the second gear element with the following operational modes:

lock the second gear element for rotation with the shaft in forward and reverse torque directions;

lock the second gear element for rotation with the shaft in the forward torque direction and not lock in the reverse torque direction; and lock the second gear element for with rotation with the shaft in the reverse torque direction and not lock in the forward torque direction.

6. The transmission system of claim 4, wherein:

in a condition wherein the first gear element is engaged by the first and second sets of engagement members and is locked for rotation in forward and reverse torque directions, one of the first and second sets of engagement members is in a loaded condition and the other of the first and second sets of engagement members is in an unloaded condition, wherein the actuator assembly is arranged to selectively move the unloaded set of engagement members out of engagement with the first gear element; and/or in a condition wherein the second gear element is engaged by the first and second sets of engagement members and is locked for rotation in forward and reverse torque directions, one of the first and second sets of engagement members is in a loaded condition and the other of the first and second sets of engagement members is in an unloaded condition, wherein the actuator assembly is arranged to selectively move the unloaded set of engagement members out of engagement with the second gear element.

7. The transmission system of claim 4, wherein the first selector assembly is mounted on to the shaft by means of a support sleeve, wherein the support sleeve includes internal splines arranged to lock the support sleeve for rotation with the shaft.

8. The transmission system of claim 7, wherein at least one of the engagement members in the first set of engagement members includes a rectilinear formation formed on an inwardly facing side, that is arranged to engage with a complementary formation of the support sleeve; and/or at least one of the engagement members in the second set of engagement members includes a rectilinear formation formed on an inwardly facing side, that is arranged to engage with a complementary formation of a support sleeve.

9. The transmission system of claim 4, including a second gear selector assembly; and a third gear selector assembly; wherein the actuator assembly is arranged to control operation of the second and third gear selector assemblies.

10. The transmission system of claim 9, wherein the actuator assembly includes a shift drum having first and second parts, wherein the second part is arranged to rotate relative to the first part, the second part includes a first control slot that is arranged to control operation of the first selector assembly and a second control slot that is arranged to control operation of the second gear selector assembly, and the first part includes a third control slot that is arranged to control operation of the third gear selector assembly.

11. The transmission system of claim 10, wherein the actuator assembly includes a first shift collar mounted on a first shift rail, said first shift collar including a first control member that engages with the first control slot; the actuator assembly includes a shift drum having first and second parts, wherein the second part is arranged to rotate relative to the first part; wherein the shift drum is arranged such that adjusting the rotational orientation of the second part of the shift drum adjusts the position of the first control member along the first control slot, which controls the axial position of the first shift collar with respect to the first shift rail.

12. The transmission system of claim 9, wherein the second gear selector assembly includes a third selector ring, and the actuator assembly includes a second shift fork assembly, the second shift fork assembly including a third shift fork arranged to control axial movement of the third selector ring.

13. The transmission system of claim 9, wherein odd gears are grouped together in a first part of the transmission and even gears are grouped together in a second part of the transmission, and the second gear selector assembly is arranged to select between odd and even gears by selectively creating torque pathways to the first part of the transmission and the second part of the transmission.

14. The transmission system of claim 9, wherein the third gear selector assembly includes a further selector ring, and the actuator assembly includes a further shift fork assembly, the further shift fork assembly including a further shift fork arranged to control axial movement of the further selector ring.

15. The transmission system of claim 9, wherein the shaft comprises a first lay shaft, and further including an output shaft and a second lay shaft, wherein the third gear selector assembly is mounted on one of the output shaft, the second lay shaft and a sleeve mounted on the second lay shaft, at least one further gear element is rotatably mounted on the same shaft as third gear selector assembly, and the third gear selector assembly is arranged to selectively lock the at least one further gear element for rotation with the shaft on which it is mounted.

16. The transmission system of claim 9, wherein the third gear selector assembly comprises a pre-select selector assembly, which is arranged to pre-select a new gear during a gear shift prior to the first and second gear selector assemblies being operated.

17. The transmission system of claim 4, wherein the actuator assembly includes a first shift fork assembly, the first shift fork assembly including a first shift fork arranged to control axial movement of the first selector ring and a second shift fork arranged to control axial movement of the second selector ring.

18. The transmission system of claim 1, wherein the first gear selector assembly is arranged to provide torque support during a gear shift, to ensure that there is no loss of drive during the gear shift.

19. The transmission system of claim 1, including a first input shaft that is directly connected to the output of a drive source, and a second input shaft that is connected to the output of the drive source via a friction clutch.

20. The transmission of claim 19, further including;

an actuator assembly arranged to control movement of the first and second selector rings, wherein the first selector assembly is mounted on a shaft, a first gear element is rotatably mounted on the shaft, a second gear element is rotatably mounted on the shaft, and the first selector assembly is arranged to selectively lock the first and second gear elements for rotation with the shaft; and a second gear selector assembly wherein the second gear selector assembly is mounted on the second input shaft, a third gear element is rotatably mounted on the second input shaft, a fourth gear element is rotatably mounted on the second input shaft, and the second gear selector assembly is arranged to selectively lock each of the third and fourth gear elements for rotation with the second input shaft.

21. A drive train including a drive source, a friction clutch device and a transmission system according to claim 1.

22. A transmission system, comprising:

a first gear selector assembly, wherein the first gear selector assembly includes a first selector ring and a second selector ring, the first selector ring and the second selector ring being movable translationally relative to one another;

wherein the first selector ring includes a first set of engagement members fixed together by a first annular member, and each engagement member in the first set includes a first part located on a first side of the first annular member and a second part located on a second side of the first annular member, each first part having a first drive face oriented generally in a first rotational direction and a first non-drive face oriented generally in a second rotational direction, and each second part includes a second drive face oriented generally in the first rotational direction and a second non-drive face oriented generally in the second rotational direction; and wherein the second selector ring includes a second set of engagement members fixed together by a second annular member, and each engagement member in the second set includes a first part located on a first side of the second annular member and a second part located on a second side of the second annular member, each first part having a first drive face oriented generally in the second rotational direction and a first non-drive face oriented generally in the first rotational direction, and each second part includes a second drive face oriented generally in the second rotational direction and a second non-drive face oriented generally in the first rotational direction;

a first input shaft directly connected to the output of a drive source, a second input shaft connected to the output of the drive source via a friction clutch, an actuator assembly arranged to control movement of the first and second selector rings, a first lay shaft, a first gear element rotatably mounted on the first lay shaft, a second gear element rotatably mounted on the first lay shaft, wherein the first selector assembly is mounted on the first lay shaft and is arranged to selectively lock each of the first gear element and the second gear element for rotation with the first lay shaft; and a second gear selector assembly mounted on the second input shaft, a third gear element rotatably mounted on the second input shaft, and a fourth gear element rotatably mounted on the second input shaft, wherein the second gear selector assembly is arranged to selectively lock each of the third gear element and the fourth gear element for rotation with the second input shaft.

* * * * *